May 5, 1959
C. CARROLL
2,884,800
WORM DRIVE MECHANISM
Filed May 1, 1957
4 Sheets-Sheet 1
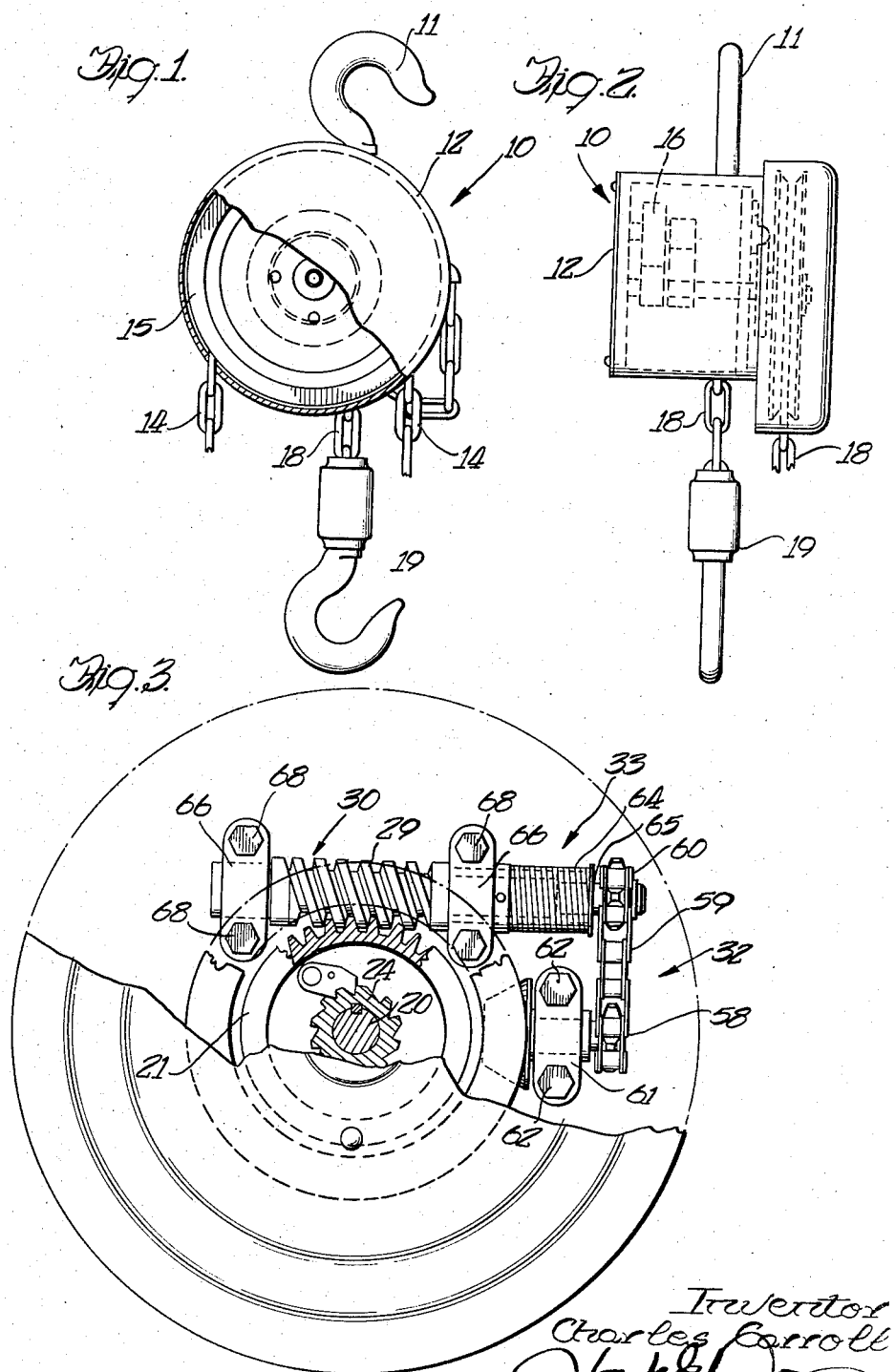

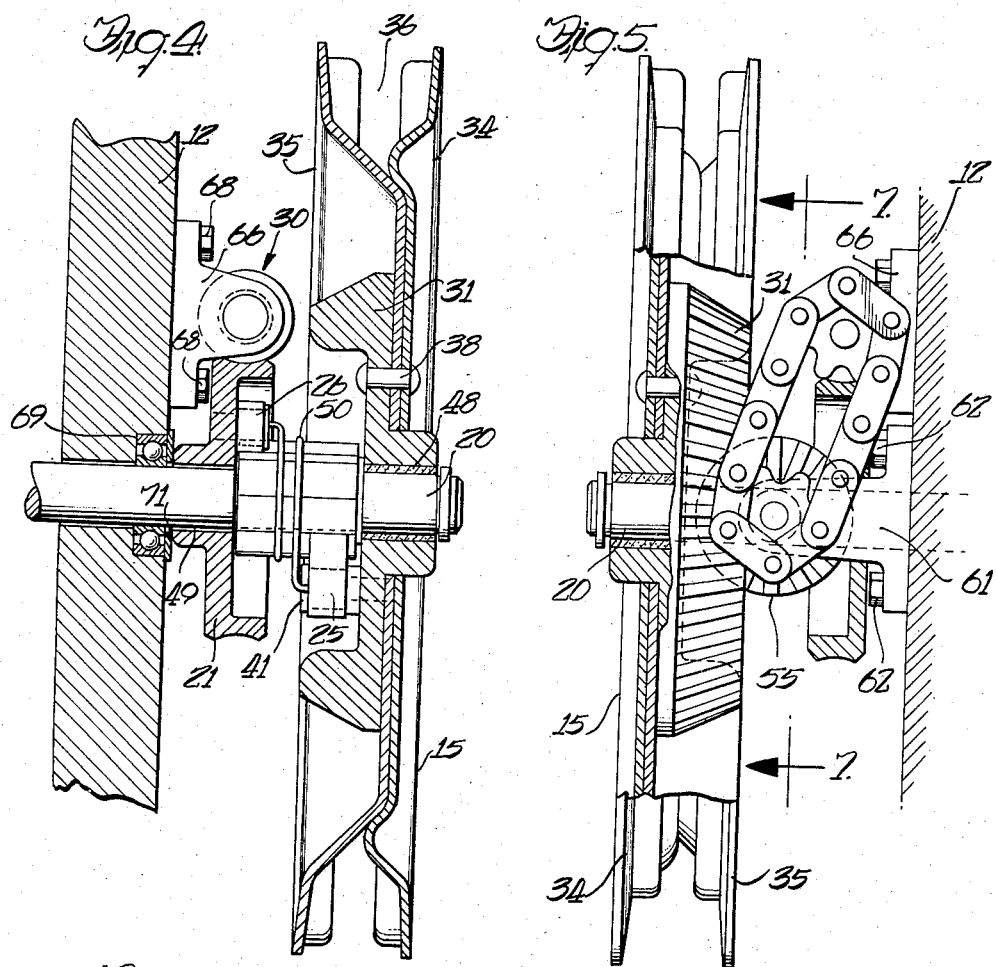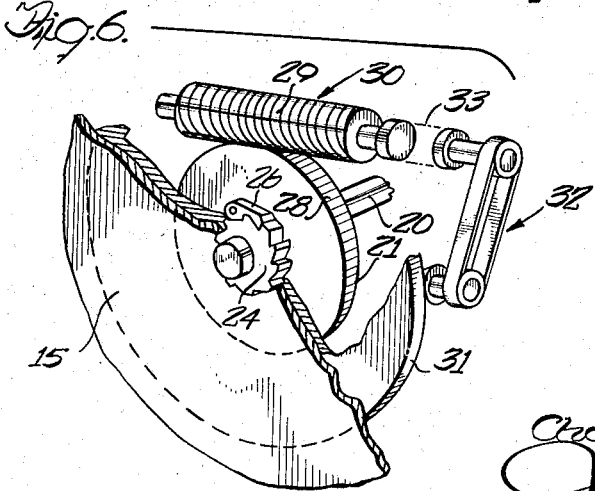

May 5, 1959

C. CARROLL 2,884,800

WORM DRIVE MECHANISM

Filed May 1, 1957

Inventor
Charles Carroll
Attorney

May 5, 1959
C. CARROLL
2,884,800
WORM DRIVE MECHANISM
Filed May 1, 1957
4 Sheets-Sheet 4
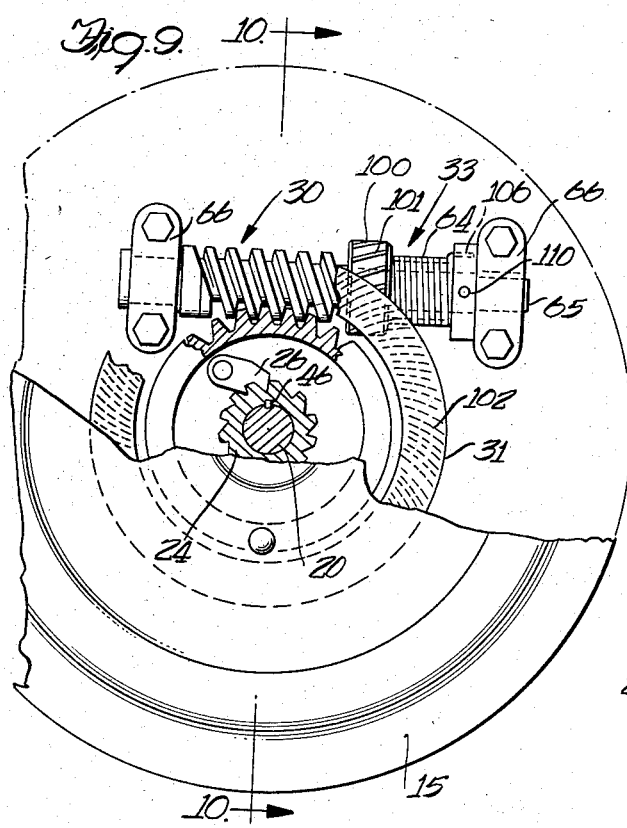
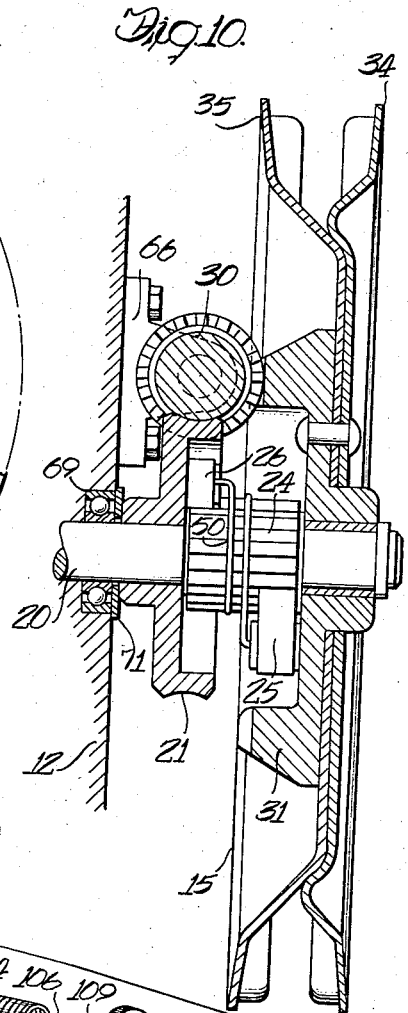
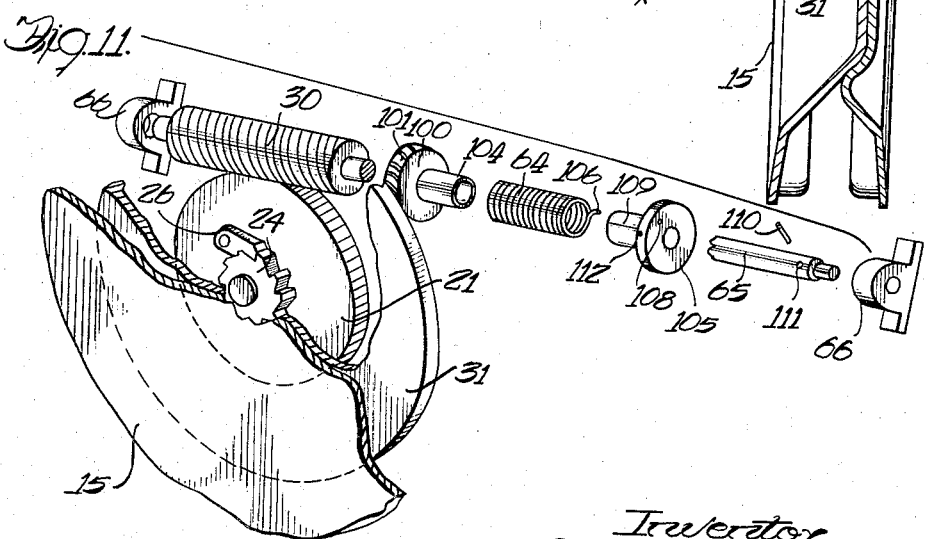
Inventor
Charles Carroll
Attorney United States Patent Office 2,884,800
Patented May 5, 1959

2,884,800

WORM DRIVE MECHANISM

Charles Carroll, Danville, Ill., assignor to Duff-Norton Company, Pittsburgh, Pa.

Application May 1, 1957, Serial No. 656,455

8 Claims. (Cl. 74—425)

The present invention relates to a worm drive. In its broadest scope of the invention employs the known irreversability of a worm drive to effect a braking action. Although a wide variety of usages are contemplated, the invention will be illustrated as embodied in a manually operated hoist.

In many instances where load lifting and other gearing is involved, it is necessary to brake or "freeze" the load at any point when the power is released from the drive. Conventionally friction brakes are used for this purpose, such brakes being of the shoe and drum variety or variations of such friction brakes. These units suffer, in varying degrees, from unpredictable capacityl due to temperature variations, water or ice on the brake linings, and a wide range of other disabilities. Consequently it is desirable to employ a brake which is uniform in operation when subjected to such conditions, and additionally can be sealed at the factory for many years' usage.

Accordingly it is the general object of the present invention to furnish a worm brake for a gear drive which is dependable for a maximum of operating conditions. A more detailed object of the invention is to provide such a worm brake drive which can be sealed and permanently lubricated.

Another object of the invention is to provide a worm brake for a gear drive which is economical to manufacture while fulfilling the objectives set forth above.

An even further object of the invention is to provide a worm brake for a manually operated hoist which insures both safety and efficient load handling. In connection with such a hoist application, another object of the invention is to furnish a worm brake drive which can be built into a hoist and effect a weight saving over known hoists of like capacity.

Further objections and advantages of the present invention become apparent as the following description of illustrative embodiments of the invention proceeds, taken in conjunction with the accompanying drawings, in which:

Figure 1 is a partially sectioned front elevation of a typical chain hoist in which an illustrative worm brake finds particular utility.

Fig. 2 is an end view of the hoist shown in Fig. 1 illustrating the spacial relationship between the various components.

Fig. 3 is an enlarged partial section of the worm brake mechanism employed in the hoist shown in Figs. 1 and 2.

Fig. 4 is an enlarged partial section end view of the mechanism shown in Fig. 3, taken from the left end thereof.

Fig. 5 is an enlarged partial sectional end view of the mechanism shown in Fig. 3 taken from the right end thereof.

Fig. 6 is a schematic diagram of the basic elements in the worm brake illustrated in the preceding five figures.

Fig. 9 is a front elevation in partial section, of an alternative worm brake mechanism in which curved tooth gearing is employed.

Fig. 10 is an enlarged sectional view of the alternative embodiment worm brake illustrated in Fig. 9, taken along line 10—10 of Fig. 9.

Fig. 11 is an exploded partially diagrammatic view of the alternative embodiment worm brake illustrated in Figs. 9 and 10.

Figure 7:
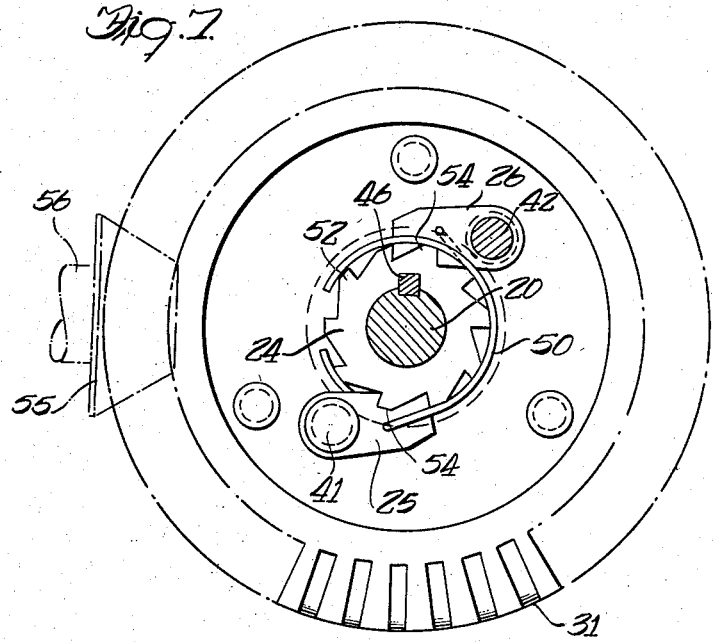
Fig. 7 is an enlarged partial sectional end view taken along section line 7—7 of Fig. 5, illustrating the relationship of the rachet drive.

In broad outline the invention utilizes the irreversible drive of a worm gear as a load brake. This is achieved through the unique combination of one way drives of the pawl and rachet, spring loaded gear, coaxial spring and equivalent types, along with a worm spur and worm. The assembly presupposes a drive shaft on which a drive gear, wheel or other element for driving by rotating is journaled. A worm spur is also journaled to the shaft. Then a one way drive is secured to the shaft, preferably between the worm spur and drive wheel, so that either the worm spur or driving wheel can independently drive the shaft in one direction or overrun in "free wheeling" in the opposite direction. The direction of drive and free wheeling with relation to the shaft is the same for the drive wheel and the worm spur. A worm is then engaged with the worm spur. If the drive shaft load tries to "back up" the worm spur is engaged by its one way drive and locks against the worm. A second one way drive or clutch is on the end of the worm shaft, and is engaged when the drive wheel is reversed, thereby driving the worm and worm spur to release the load. Thus when the driving wheel is driven, the drive shaft powers its load. When the drive wheel is free the worm and spur engage and prevent the load from reversing the drive shaft. To release the load, the drive wheel is reversed, and through the worm one way clutch engagement the drive shaft is also reversed by the driving action of the worm assembly.

Before going into the details of construction of the physical embodiments which the worm brake may take, it will prove helpful to reflect upon the environment in which the worm brake may find particular utility. Referring now to Fig. 1, there is shown a manual chain hoist 10. Such a hoist is secured from an overhead beam or A-frame by means of the support hook 11 which in turn is secured to the housing 12. An endless drive chain 14 engages a drive wheel 15 which, through reduction gear assembly 16 raises or lowers the hoist chain 18 and its accompanying load hook assembly 19.

Naturally, when such a manually operated hoist is employed, its safe operation depends upon an effective braking mechanism to "freeze" or retain the load hook assembly 19 in whatever position it is raised to or lowered to. The capacity of any such hoisting mechanism is no better and no worse than the effectiveness of the brake which accomplishes this function. As pointed out above, where friction brakes are employed, the braking capacity may vary depending upon weather conditions, the materials employed in the friction brakes, and a wide variety of other variables. Where a worm brake is employed, as will be outlined in detail hereinafter, the capacity of the unit can be readily predicted inasmuch as the brake mechanism presupposes metallic interference and contact within a housing which may be completely sealed from weather variables.

Referring now to Fig. 6, a schematic diagram, it will be seen that the basic elements of the worm brake are susceptible of orientation in a compact package. The drive shaft 20 carries a driving wheel 15 and a worm spur 21 which flank a common rachet assembly 22, the rachet wheel 24 being secured to the drive shaft 20. The worm spur 21 and driving wheel 15 rotate freely on the drive shaft 20.

A driving wheel pawl 25 and spur gear pawl 26 are pivotally secured respectively to the driving wheel 15 and worm spur 21. The pawls 25, 26 are both oriented to engage the rachet wheel 24 in a common direction. For example, when the driving wheel is rotated in a clockwise direction, the rachet wheel 24 is engaged by the driving wheel pawl 25 and thereby drives the shaft 20 in a clockwise direction. This action, of course, has no effect on the worm spur 21 as the worm spur pawl 26 overruns the rachet wheel 24. In the event an attempt is made to rotate the shaft in a counter-clockwise direction, the worm spur pawl 26 is engaged by the rachet wheel 24 which attempts to drive the worm spur 21 in a counter-clockwise direction. Because the worm spur teeth 28 are engaged with the spiral teeth 29 of the worm 30, no motion takes place, as the worm spur 21 can only be driven by the worm 30. The worm spur 21 cannot drive the worm 30. As a result of this action, it can be readily seen from Fig. 6 that while the driving wheel 15 may be employed to raise a load through driving the drive shaft 20 in a clockwise direction, the worm spur assembly 30, 21 may be employed to hold the load in a position without applying any force to the driving wheel 15.

In order to lower or reverse the load on the shaft 20, the drive wheel 15 is reversed and rotated in a counter-clockwise direction. This action rotates the drive wheel ring gear 31 which is secured to the drive wheel 15. Through an intermediate drive assembly 32, the counter-clockwise rotation of the ring gear 31 is transmitted to a one way clutch 33. The one way clutch 33 is so oriented that the worm 30 is driven by the drive wheel ring gear 31 to rotate the worm spur 21 in a counter-clockwise direction. This action releases the pressure on the worm spur pawl 26 permitting the load to turn the shaft 20 in a counter-clockwise direction so that the rachet wheel 24 follows the worm spur pawl 26. Although a number of equivalent mechanisms are contemplated to accomplish the foregoing motion, the worm and spur as well as the one way drive assemblies are essential elements of the structure.

Figure 8:
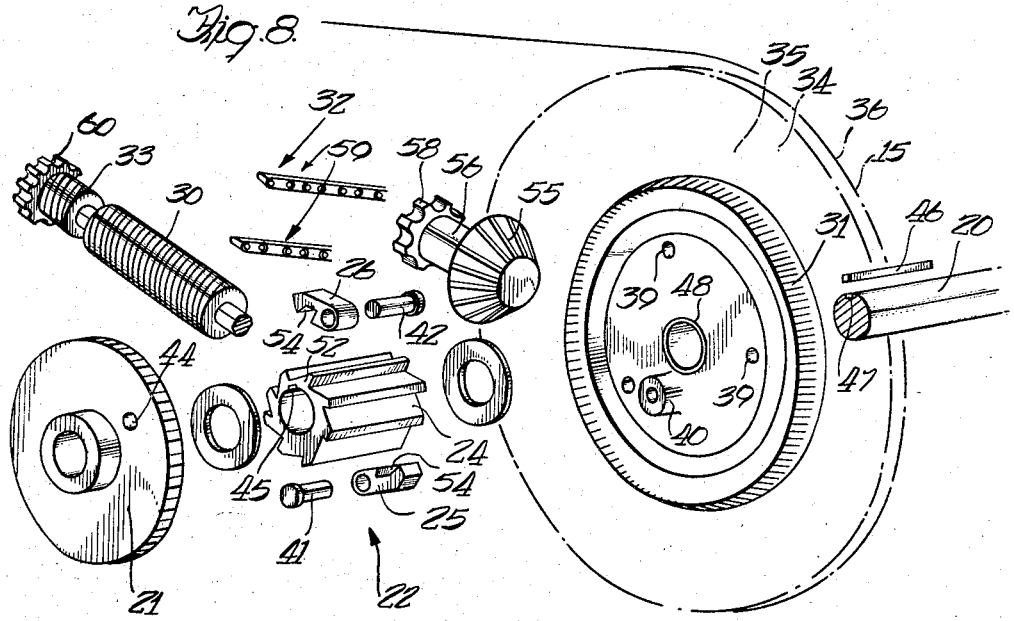
Fig. 8 is an exploded view of the components of the worm brake mechanism illustrated in the preceding 7 figures.

Having the basic principle of operation in mind, the details of construction will be more fully understood from the drawings. Referring now to the exploded view in Fig. 8, it will be seen that the drive wheel 15 contemplates two pressed halves 34, 35 which form at their peripheral portion a chain grip 36. The two drive wheel halves 34, 35 are riveted together by means of rivets 38 which pass through ring gear mounting holes 39 thereby securing the ring gear 31 integrally with the drive wheel 15. A ring gear pawl mounting boss 40 is provided on the inner portion of the ring gear 31 to receive the ring gear pawl mounting pin 41. The worm spur pawl 26 is pivotally secured to the worm spur 21 by means of worm spur pawl mounting pin 42 which projects into the mounting hole 44 in the worm spur 21. The rachet wheel 24 has an internal key way 45 which receives the rachet wheel key 46. The rachet wheel key 46 rides in the key way 47 from the drive shaft 20. It will be apparent from this construction, as outlined above, that the rachet wheel 24 is the only element which is rigidly secured to the drive shaft 20. The drive wheel 15 and its associated ring gear 31, as well as the worm spur 21, are journaled on the drive shaft 20. A ring gear bushing 48 insures a smooth rolling fit of the drive wheel assembly 15 on the shaft 20. Similarly, a worm spur bushing 49 insures a smooth journal relationship between the worm spur 21 and the drive shaft 20. Referring now to Fig. 7 it will be seen that the two pawls are held in yieldable engagement with the spur wheel 24 by means of a rachet around spring 50, the ends of which are bent forming shearings into detent holes in the pawls 25, 26. As a consequence, it is obvious from the illustration in Fig. 7 that when the rachet wheel 24 rotates in a counter-clockwise direction, the rachet teeth 52 are not engaged by the pawl tooth engaging detents 54. Consequently, the central rachet assembly, which is located between the driving wheel 15 and the worm spur 21, serves as a common way drive assembly for the drive wheel 15 and the worm spur 21. Not only is the drive common to the rachet wheel 24, but the direction is common, that is, when the shaft 20 rotates in one direction, both the pawls 25, 26 engage the rachet wheel 24 and attempt to drive their respective assemblies. On the other hand, when the shaft 20 is rotated in the opposite direction, the detents 25, 26 overrun the teeth 52 of the rachet wheel 24.

In order to lower or release the braking action of the worm brake, the worm 30 must be energized or rotated. This is accomplished through intermediate drive assembly 32. The intermediate drive assembly 32 contemplates a bevel spur 55 which engages the ring gear 31. A bevel spur drive shaft 56 is coupled to a bevel gear chain sprocket 58 which drives the roller chain 59 and the one-way clutch chain sprocket 60. The bevelled spur drive shaft 56 is suitably journaled by means of a bearing assembly 61 bolted to the housing 12 by means of mounting bolts 62.

The one way clutch worm drive assembly 34 contemplates a coil spring 64 which engages the worm drive shaft 65 in one direction only. The worm 30, as will be seen in Fig. 3, is secured to the housing 12 by means of worm mounting bearing assemblies 66, bolted to the housing with worm bearing mounting assembly bolts 68. The ball bearing 69 is provided in the housing 12 to journal the drive shaft 20. A washer 71 separates the ball bearing 69 from the worm spur 21. Additional washers along the drive shaft 20 are contemplated to separate the various elements as needed.

By employing curve tooth gearing in the ring gear 31, it is possible to condense the assembly 32 between the ring gear 31 and the one way clutch assembly 34. Figs. 9, 10 and 11 illustrate an alternative embodiment of the invention which operates in this manner. As will be observed, the drive wheel 15, shaft 20, common ratchet wheel 24, pawls 25, 26, worm spur 21, and worm are substantially identical with the construction outlined in detail above. A spur gear 100 with curved teeth 101 engages the curved teeth 102 on the ring gear 31. In this manner rotary motion is imparted to a sleeve 104 coaxially with the worm shaft 65. The clutch spring 64 slips over the curved tooth spur gear sleeve 104 and is rotated by the clutch drive 105 which engages the spring end 106 in the spring detent holes 108. The clutch drive 105 has an integral sleeve 109 which fits within the curved tooth spur sleeve 104 and is journaled on the worm drive shaft 65. The worm drive shaft, in turn, is connected to the clutch drive 105 by means of a set screw 110 on which engages a threaded hole 111 on the worm drive shaft 65 as well as the thread hole 112 on the clutch drive 105.

A wide degree of latitude is involved in selecting the various gear ratios employed. For best results, however, the worm ratio should be higher than the running gear pin ratio. This insures an overrunning action of the driving wheel pawl 25 through the lowering cycle. If the converse were true, the lowering cycle might involve metallic interference. The difference in ratio also will accommodate a certain amount of play in the spring clutch assembly 64.

Although a coil spring type one way clutch assembly 64 has been shown and described in detail, it will be apparent that any equivalent structure will operate. For example, it is contemplated that a pair of opposed rotating faces with cammed teeth, spring loaded for contact, could satisfactorily be employed. Also, a wide variety of internally expanding shaft constructions might be employed. The invention contemplates any such one way clutch constructions. In addition, the common rachet wheel 24 with its associated pawls 25, 26 could also be replaced by equivalent one way clutch constructions.

Although only certain embodiments of the invention have been shown and described in full here, there is no intention to thereby limit the invention to the details of such embodiments. On the contrary, the intention is to cover all modifications, alternative embodiments, usages and equivalents of the worm brake drive as fall within the spirit and scope of the invention, specification and appended claims.

I claim as my invention:

1. A worm drive comprising, in combination, driving means for selectively rotating a shaft against a load, a worm spur for selectively rotating the shaft in the same direction as the driving means, a worm in mesh with the worm spur, a one way clutch, connecting means transmitting power from the driving means to the one way clutch, the clutch being oriented to be disengaged when the shaft is being driven by the driving means working against the load, the elements being proportioned and oriented to engage the worm spur with the load when no external power is applied to the driving means and yet permit a translation of the load by reversing the driving means thereby engaging the one way clutch to actuate the worm to rotate the worm spur and shaft to release the load.

2. A worm drive comprising, in combination, driving means for rotating a shaft in one direction, a worm spur for driving the shaft in the same direction as the driving means, a worm in mesh with the worm spur, a one way clutch, connecting means transmitting power from the driving means to the one way clutch, the clutch being oriented to be disengaged when the shaft is being driven by the driving means working against the load, the elements being proportioned and oriented to engage the worm spur with the load when no external power is applied to the driving means and yet permit a translation of the load by reversing the driving means thereby engaging the one way clutch to actuate the worm to rotate the worm spur and shaft to release the load.

3. A worm drive comprising, in combination, a shaft, common one way clutch means secured to the shaft, a driving wheel journaled on the shaft, a worm spur journaled on the shaft, second one way clutch engaging means on the driving wheel and worm spur to engage the common one way clutch means in a common direction, a worm in mesh with the worm spur, a one way clutch secured to the worm, and connecting means coupling the driving wheel to the worm through the one one way clutch so that when the driving wheel one way clutch engaging means engages the common one way clutch, the second one way clutch means overruns, but when the driving wheel is reversed the second one way clutch means engages the worm thereby rotating the worm spur to release the shaft load which is braked by the worm gear assembly when the unit is at rest.

4. A worm drive comprising, in combination, a shaft, common rachet means secured to the shaft, a driving wheel journaled on the shaft, a worm spur journaled on the shaft, pawl means on the driving wheel and worm spur to engage the common rachet means in a common direction, a worm in mesh with the worm spur, a one way clutch secured to the worm, and connecting means coupling the driving wheel to the worm through the one way clutch so that when the driving wheel pawl means engages the common rachet the one way clutch overruns, but when the driving wheel is reversed the clutch engages the worm thereby rotating the worm spur to release the shaft load which is braked by the worm gear assembly when the unit is at rest.

5. A worm drive, comprising, in combination, a shaft, common rachet means secured to the shaft, a driving wheel journaled on the shaft, a worm spur journaled on the shaft, the driving wheel and worm spur being oriented the flank the rachet means, pawl means on the driving wheel and worm spur to engage the common rachet means in a common direction, a worm in mesh with the worm spur, a one way clutch secured to the worm, and connecting means coupling the driving wheel to the worm through the one way clutch so that when the driving wheel pawl means engages the common rachet the one way clutch overrruns, but when the driving wheel is reversed the clutch engages the worm thereby rotating the worm spur to release the shaft load which is braked by the worm gear assembly when the unit is at rest.

6. A worm drive comprising, in combination, a drive shaft, a drive wheel journaled on the drive shaft, a worm spur journaled on the drive shaft, one way drive means secured to the shaft, engaging means on the drive wheel and worm spur for engaging the one way drive means in a common direction, a worm in mesh with the worm spur, a one way clutch secured to the worm, a ring gear coupled to the drive wheel, a pinion engaging the ring gear, the pinion being coaxial with the worm and means coupling the pinion to the worm one way clutch so that the one way clutch is disengaged when the drive wheel engages its one way drive means, and the worm is driven when the drive wheel one way drive means is overrun or disengaged.

7. A worm drive comprising, in combination, a drive shaft, a drive wheel journaled on the drive shaft, a worm spur journaled on the drive shaft, one way drive means secured to the shaft, engaging means on the drive wheel and worm spur for engaging the one way drive means in a common direction, a worm in mesh with the worm spur, a one way clutch secured to the worm, a curved tooth ring gear coupled to the drive wheel, a curved tooth pinion engaging the ring gear, the pinion being coaxial with the worm, and means coupling the pinion to the worm one way clutch so that the one way clutch is disengaged when the drive wheel engages its one way drive means, and the worm is driven when the drive wheel one way drive means is overrun or disengaged.

8. A hoist comprising, in combination, a shaft, means for driving the shaft, means for raising and lowering a hoist chain on the shaft responsive to the rotation of said shaft, a worm gear spur on the shaft, a worm in mesh with said spur, and one-way drive means coupling the driving means to the worm whereby the worm is energized by only one direction of applied motion on the drive means thereby permitting the worm to brake the shaft except when energized.

References Cited in the file of this patent
UNITED STATES PATENTS 2,159,740   Johnson _____ May 23, 1939